United States Patent [19]

Sherif

[11] 4,375,457

[45] Mar. 1, 1983

[54] PROCESS FOR PURIFYING YELLOW PHOSPHORUS

[75] Inventor: Fawzy G. Sherif, Stony Point, N.Y.

[73] Assignee: Stauffer Chemical Company, Westport, Conn.

[21] Appl. No.: 307,128

[22] Filed: Sep. 30, 1981

[51] Int. Cl.$^3$ ............... C01B 25/01; C01B 25/02; C01B 25/04

[52] U.S. Cl. ................................ 423/322; 423/299

[58] Field of Search ............. 423/322, 323, 299, 317, 423/318; 252/435

[56] References Cited

U.S. PATENT DOCUMENTS 2,575,457  11/1951  Mavity ........................... 252/435
2,586,852  2/1952   Morrell .......................... 252/435

FOREIGN PATENT DOCUMENTS 1143794  2/1963  Fed. Rep. of Germany ...... 423/322

Primary Examiner—O. R. Vertiz
Assistant Examiner—Gregory A. Heller
Attorney, Agent, or Firm—Vivienne T. White

[57] ABSTRACT

A method for purifying yellow phosphorus is disclosed comprising contacting the molten phosphorus with a solid phosphorus acid containing catalyst comprising an oxygen acid of phosphorus carried on an inert absorbant support. The purified phosphorus is thereafter separated from the solid catalyst and preferably is separated therefrom by filtration through the catalyst layer.

8 Claims, 2 Drawing Figures

PROCESS FOR PURIFYING YELLOW PHOSPHORUS

BACKGROUND OF THE INVENTION

1. Field of the Invention

The invention relates to the purification of elemental yellow phosphorus (e.g., white phosphorus).

2. Relevant Art

Elemental yellow phosphorus, which is produced from crude phosphate by electrothermal means is generally found to contain arsenic and/or other organic contaminants, generally polynuclear aromatics in varying amounts, which account somewhat for its opaque and yellow appearance. Purified or distilled phosphorus has a transparent light yellow or white appearance. The impurities are undesirable because they are often found to restrict the use of secondary phosphorus products (e.g., phosphoric acid salts and organic phosphorus compounds). Yellow phosphorus is one of several allotropic forms of phosphorus.

It is known that elementary yellow phosphorus is a useful starting material for the manufacture of phosphorus derivatives, such as $P_2S_5$, for example. To this end, it is often necessary to first free the phosphorus from contaminates contained therein. The purification of phosphorus by subjecting it to treatment with concentrated sulfuric acid in a reactor has been described. Sometimes, however, the reactor may be found to show the phenomena of local overheating. This in turn can initiate self-ignition of the phosphorus and culminate in fire outbreaks and explosions.

It is also known that yellow phosphorus can be purified by treating the phosphorus with between 0.5 and 5 weight percent of an aqueous suspension of activated carbon. It has further been disclosed to purify yellow phosphorus with from 0.5 to 5 weight percent of an aqueous suspension of activated carbon containing between 50 and 500 kilograms per cubic meter of activated carbon.

It has also been disclosed in German Pat. No. 1,143,794 to Cremer to purify phosphorus by subjecting it to treatment with polyphosphoric acid (density 1.91 to 2.08; 75% to 85% $P_2O_5$) followed by filtration through a bed of activated charcoal and ignited Fuller's earth.

The process as disclosed in the above referenced German patent, entails mixing the polyphosphoric acid with the liquid unpurified phosphorus and thereafter separating the two layers either by initially drawing off the lower polyphosphoric acid layer, or by diluting the spent polyphosphoric acid with water until it is separated as an upper layer so that the phosphorus can be drawn off as the lower layer. Either of these methods of recovering the purified phosphorus is time consuming and otherwise complicates a simple and direct purification process.

SUMMARY OF THE INVENTION

It has been discovered that purification of yellow phosphorus can be accomplished in a direct and simple one step process comprising contacting molten yellow phosphorus with a solid catalyst comprised of an oxygen acid of phosphorus carried on an inert porous support and separating the purified phosphorus from the solid catalyst. Preferably the purified phosphorus is allowed to filter through the catalyst layer.

DETAILED DESCRIPTION OF THE INVENTION

Figure 1:
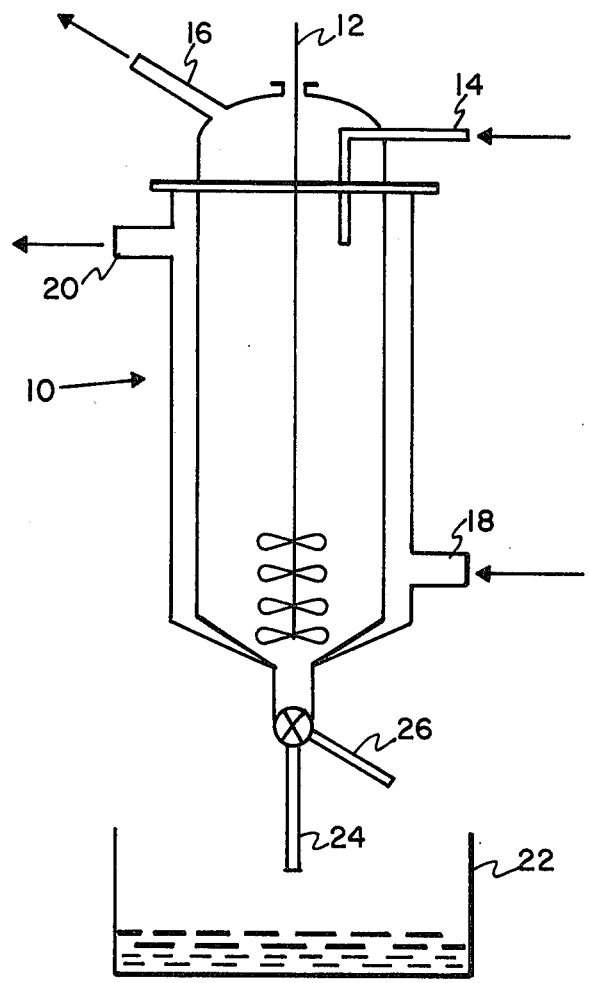

The invention is a method of purifying yellow phosphorus utilizing a solid phosphoric acid containing catalyst, preferably containing from about 40% to 60% $P_2O_5$, on an inert porous support.

The phosphoric acid containing catalyst is produced by combining an oxygen acid of phosphorus preferably one in which the phosphorus has a valence of 5, with an inert absorbant support in a ratio of from 20% to 80% by weight of the phosphoric acid to 80% to 20% by weight of an inert absorbant support. The mixture comprising the phosphoric acid and the absorbant is shaped by any known method preferably by extrusion to form pellets.

The support can be any inert absorbant composition such as clays, charcoal and the like and preferably diatomaceous earth or synthetic silica which will absorb the polyacid and be inert to the molten acid.

The oxygen acid of phosphorus of the solid catalyst, can comprise any oxygen acid having a $P_2O_5$ content of from about 40% to about 60% by weight of the acid. The oxygen acid of phosphorus in the practice of the invention can be phosphate rock reacted with sulfuric acid to form calcium sulfate and phosphoric acid having the requisite $P_2O_5$ content. Various other acids of phosphorus such as orthophosphoric acid ($H_3PO_4$), pyrophosphoric acid ($H_4P_2O_7$) and, triphosphoric acid ($H_5P_3O_{10}$) may be used as the phosphoric acid content of the solid catalyst. These catalytic compositions may also be prepared from mixtures of phosphoric acid, pyrophosphoric and triphosphoric acid and other polyphosphoric acids including tetraphosphoric acid ($H_6P_4O_{13}$).

U.S. Pat. No. 2,575,457, incorporated herein by reference discloses various polyphosphoric acids which may be utilized in the process of this invention.

In accordance with the process of the invention the solid catalyst can be used "as is" or is crushed or ground and mixed by any appropriate method with the molten yellow phosphorus at a temperature not exceeding the boiling point of the phosphorus and generally at a temperature of from about 40° C. to about 200° C. preferably from about 40° C. to about 80° C.

The contacting or mixing time can be from about five minutes to about one hour. The transparent purified phosphorus having a light yellow appearance can then be separated from the solid catalyst by any known process. Preferably, however, after mixing the phosphorus with the catalyst, the phosphorus is allowed to filter through the catalyst layer and is collected under water. The phosphorus produced by the method disclosed has a transparent light yellow color.

The action of the polyphosphoric acid in purifying yellow phosphorus is enhanced by the presence of the solid inert absorbent material. Impurties contained in the phosphorus adhere to the surface of the solid material and are thus removed from the phosphorus.

The ratio of phosphorus to catalyst can vary from about 10 to 1 to about 1 to 1, preferably from about 5 to 1 to 2 to 1.

Yellow phosphorus obtained from a variety of sources contain varying amounts of impurities depending on the source. It is, therefore, not the intention to limit the invention to any specific concentration or ratio of catalyst to the crude phosphorus being treated.

The following examples are not to be construed as imposing any limitations upon the scope of the invention disclosed herein.

EXAMPLE 1

The water jacketed reactor 10 of FIG. 1 contains a glass stirrer 12 for stirring the molten phosphorus with the crushed solid phosphoric acid catalyst. The reactor also contains an inlet 14 and outlet 16 for nitrogen gas and an inlet 18 and outlet 20 for circulating hot water through the jacket of the reactor for melting the phosphorus. A beaker 22 containing water is positioned to collect the purified $P_4$ exiting the reactor through outlet 24. There is also an outlet 26 means for removing spent catalyst from the reactor.

A 30 gm. sample of a commercially derived phosphorus which was opaque and tan in color was melted and stirred with 10 gm. of a polyphosphoric acid catalyst comprised of 60% $P_2O_5$, 35% $SiO_2$ and 5% $H_2O$. The catalyst was ground to a fine powder and placed in a water jacketed reactor shown in FIG. 1 and heated at from 50° C. to 60° C. for 15 minutes. Thereafter the molten phosphorus was then discharged from the reactor drop wise into a beaker of warm distilled water as shown. The molten phosphorus in the beaker had a light transparent yellow appearance.

EXAMPLE 2

A 27.8 gm. sample of phosphorus purified in accordance with Example 1 was weighed in molten form, then cooled and solidified. A 72.13 gm. sample of sulfur was weighed and put in the reactor as shown in FIG. 2.

Figure 2:
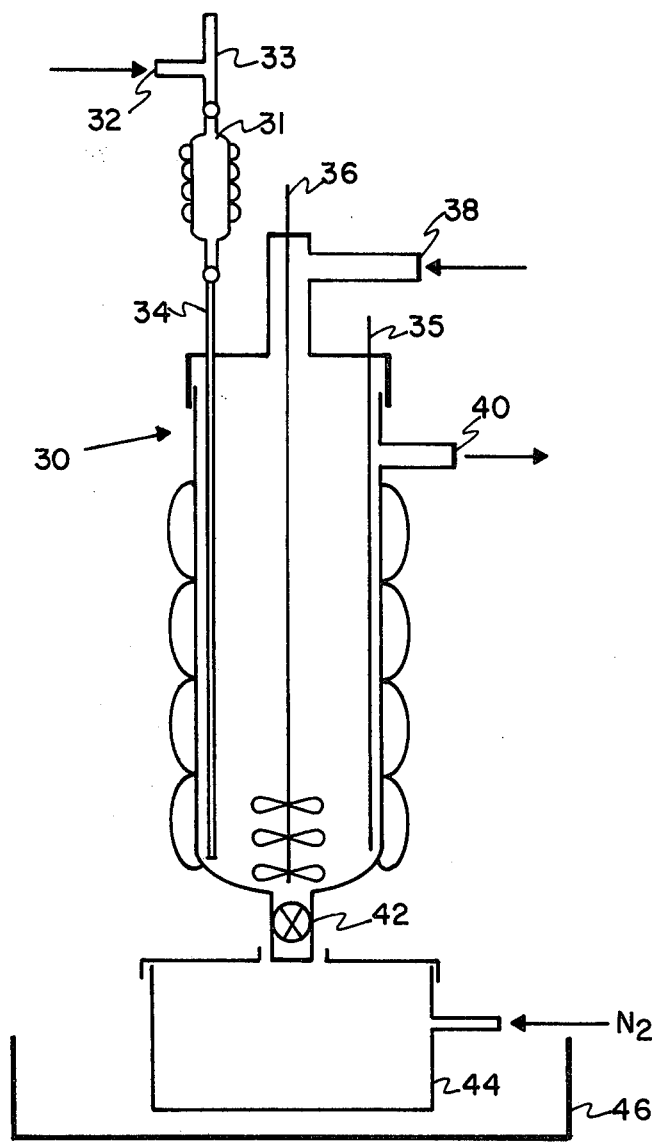

The reactor of FIG. 2 is used to synthesize $P_2S_5$. The reactor can best be described with reference to FIG. 2. The reactor 30 contains a chamber 31 wherein $P_4$ is heated and temperature controlled by a thermocouple (not shown). The chamber 31, having nitrogen inlet and outlet means 32 and 33 respectively is also provided with outlet means 34 for transfering the molten $P_4$ into reactor 30. Reactor 30 is also electrically heated and contains a temperature control means 35. The reactor is additionally equipped with a stirrer 36, inlet and outlet means 38 and 40 respectively for conducting the synthesis under a nitrogen atmosphere, and an outlet means 42 for the $P_2S_5$ product. A beaker 44 surrounded by dry ice 46 and having a nitrogen atmosphere is provided for collecting the $P_2S_5$ produced.

The solid purified phosphorus was added to a chamber of FIG. 2 as shown having means of conveying phosphorus to the reactor chamber. The sulfur was melted by heating it to about 200° C., and the chamber containing the phosphorus was heated to about 60° C. Nitrogen gas was used to blanket both reactor and chamber. When the phosphorus was in a molten condition, it was introduced drop wise into the molten sulfur over a period of 30 minutes. The contents of the reactor was slowly stirred during the phosphorus addition. The reaction temperature increased to about 450° C. After completion of the phosphorus addition the $P_2S_5$ product formed in the reactor was transferred under nitrogen into a beaker surrounded by dry ice. The color of the $P_2S_5$ was bright yellow and similar to that of distilled $P_2S_5$.

EXAMPLE 3

As a control $P_2S_5$ was produced as detailed above in Example 2 with the exception that unpurified phosphorus from the same source as in Example 1 was used. The $P_2S_5$ product was grey in color similar to undistilled $P_2S_5$.

What is claimed:

1. A process of purifying yellow phosphorus comprising contacting the yellow phosphorus with an oxygen acid of phosphorus carried on a solid inert absorbent support, and separating the purified phosphorus product therefrom.

2. The process of claim 1 further comprising allowing the purified phosphorus to filter through the supported oxygen acid of phosphorus after contact therewith.

3. The process of claim 1 wherein the oxygen acid of phosphorus has a $P_2O_5$ content ranging from about 40% to about 60% by weight of the acid.

4. The process of claim 1 wherein the supported oxygen acid of phosphorus comprises from about 20% to about 80% of the acid to from about 80% to about 20% of the inert absorbent support.

5. The process of claim 1 wherein the inert absorbent support is diatomacious earth.

6. The process of claim 1 wherein the inert absorbent support is synthetic silica.

7. The process of claim 1 wherein the supported oxygen acid of phosphorus is produced in the form of extruded pellets.

8. The process of claim 1 wherein the solid absorbent support is ground prior to use.

* * * * *